(12) United States Patent
Lee et al.

(10) Patent No.: US 8,951,669 B2
(45) Date of Patent: Feb. 10, 2015

(54) ELECTRODE HAVING POROUS COATING LAYER, MANUFACTURING METHOD THEREOF AND ELECTROCHEMICAL DEVICE CONTAINING THE SAME

(71) Applicant: LG Chem, Ltd., Seoul (KR)

(72) Inventors: Joo-Sung Lee, Daejeon (KR); Jong-Hun Kim, Daejeon (KR); Jeong-Min Ha, Daejeon (KR); Sun-Mi Jin, Daejeon (KR); Bo-Kyung Ryu, Daejeon (KR); Jin-Woo Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 13/965,413

(22) Filed: Aug. 13, 2013

(65) Prior Publication Data

US 2014/0023921 A1    Jan. 23, 2014

Related U.S. Application Data

(63) Continuation of application No. PCT/KR2012/011377, filed on Dec. 24, 2012.

(30) Foreign Application Priority Data

Apr. 10, 2012    (KR) .................. 10-2012-0037356

(51) Int. Cl.
*H01M 4/13*    (2010.01)
*H01M 4/139*    (2010.01)
(Continued)

(52) U.S. Cl.
CPC .............. *H01M 4/13* (2013.01); *H01M 4/139* (2013.01); *H01M 4/66* (2013.01); *H01M 4/0404* (2013.01);
(Continued)

(58) Field of Classification Search
USPC .......... 429/231.95, 231.8, 144, 211; 427/122, 427/123, 126.3, 126.69, 58
See application file for complete search history.

(56) References Cited

U.S. PATENT DOCUMENTS

2007/0231700 A1    10/2007    Watanabe
2008/0044733 A1    2/2008    Ohata et al.
(Continued)

FOREIGN PATENT DOCUMENTS

JP    2005-353584 A    12/2005
JP    2007-273123 A    10/2007
(Continued)

*Primary Examiner* — Mark F Huff
*Assistant Examiner* — Monique Wills
(74) *Attorney, Agent, or Firm* — Lerner, David, Littenberg, Krumholz & Mentlik, LLP

(57) ABSTRACT

The present invention provides an electrode comprising a current collector; an electrode active material layer formed on at least one surface of the current collector and comprising a mixture of electrode active material particles and a first binder polymer; and a porous coating layer formed on the surface of the electrode active material layer, comprising a mixture of inorganic particles and a second binder polymer and having a thickness deviation defined by the following Formula (1), and a manufacturing method thereof:

$$(T_{max}-T_{min})/T_{avg} \leq 0.35 \quad (1)$$

wherein $T_{max}$ is a maximum thickness of the porous coating layer formed on the surface of the electrode active material layer, $T_{min}$ is a minimum thickness of the porous coating layer and $T_{avg}$ is an average thickness of the porous coating layer.

20 Claims, 2 Drawing Sheets (51) Int. Cl.
  *H01M 4/66* (2006.01)
  *H01M 4/04* (2006.01)
  *H01M 4/36* (2006.01)
  *H01M 4/62* (2006.01)
  *H01M 4/02* (2006.01)

(52) U.S. Cl.
  CPC .............. *H01M 4/366* (2013.01); *H01M 4/622* (2013.01); *Y02E 60/122* (2013.01); *H01M 2004/021* (2013.01)
  USPC ..................................... 429/211; 429/231.95

(56) References Cited

U.S. PATENT DOCUMENTS

2009/0305141 A1  12/2009  Lee et al.
2012/0088144 A1*  4/2012  Lee et al. ...................... 429/144
2012/0141877 A1*  6/2012  Choi et al. .................... 429/246

FOREIGN PATENT DOCUMENTS

| JP | 2008-179903 | 8/2008 |
| JP | 2009-193906 | 8/2009 |
| KR | 10-2007-0092621 | 9/2007 |

* cited by examiner

ELECTRODE HAVING POROUS COATING LAYER, MANUFACTURING METHOD THEREOF AND ELECTROCHEMICAL DEVICE CONTAINING THE SAME

CROSS-REFERENCE TO RELATED APPLICATION

This application is a continuation of International Application No. PCT/KR2012/011377 filed on Dec. 24, 2012, which claims priority under 35 USC 119(a) to Korean Patent Application No. 10-2012-0037356 filed in the Republic of Korea on Apr. 10, 2012, the disclosures of which are incorporated herein by reference.

TECHNICAL FIELD

The present invention relates to an electrode having a porous coating layer which can replace a separator, a manufacturing method thereof, and an electrochemical device having the same.

BACKGROUND ART

Recently, there has been an increasing interest in energy storage technology. Electrochemical devices have been widely used as energy sources in the fields of cellular phones, camcorders, notebook computers, PCs and electric cars, resulting in intensive research and development into them. In this regard, electrochemical devices are one of the subjects of great interest. Particularly, development of rechargeable secondary batteries has been the focus of attention. Recently, research and development of such batteries are focused on the designs of new electrodes and batteries to improve capacity density and specific energy.

Among currently available secondary batteries, lithium secondary batteries developed in the early 1990's have drawn particular attention due to their advantages of higher operating voltages and much higher energy densities than conventional aqueous electrolyte-based batteries, for example, Ni-MH, Ni—Cd, and $H_2SO_4$-Pb batteries. However, such lithium ion batteries suffer from safety problems, such as fire and explosion, when encountered with the use of organic electrolytes and are disadvantageously complicated to fabricate. In attempts to overcome the disadvantages of lithium ion batteries, lithium ion polymer batteries have been developed as next-generation batteries. More research is still urgently needed to improve the relatively low capacities and insufficient low-temperature discharge capacities of lithium ion polymer batteries in comparison with lithium ion batteries.

Many companies have produced a variety of electrochemical devices with different safety characteristics. It is very important to evaluate and ensure the safety of such electrochemical devices. The most important consideration for safety is that operational failure or malfunction of electrochemical devices should not cause injury to users. For this purpose, regulatory guidelines strictly restrict potential dangers (such as fire and smoke emission) of electrochemical devices. Overheating of an electrochemical device may cause thermal runaway or a puncture of a separator may pose an increased risk of explosion. In particular, porous polyolefin substrates commonly used as separators for electrochemical devices undergo severe thermal shrinkage at a temperature of 100° C. or higher in view of their material characteristics and production processes including elongation. This thermal shrinkage behavior may cause a short circuit between a cathode and an anode.

In order to solve the above safety problems of electrochemical devices, a separator having a porous coating layer formed by combining inorganic particles and binder polymers has been proposed. However, in the conventional method for producing the separator, the porous coating layer was formed by coating a slurry containing a mixture of inorganic particles and binder polymers on a surface of the porous active material layer applied on an electrode plate. In this case, the binder polymers may be penetrated into the pores of the active material layer, thereby deteriorating the quality of an electrode. Also, there were still safety problems since the porous coating layer were not formed uniformly. In this regard, Korean Patent Application Publication No. 2008-0109237 described a method for manufacturing an electrode by first applying a solvent on an active material layer before forming a porous coating layer for the purpose of avoiding the pregnation of binder polymers. However, such a method still causes problems in that a density is decreased due to the application of the solvent and the formed surface is rough.

DISCLOSURE

Technical Problem

Accordingly, it is an object of the present invention to provide an electrode having a uniform porous coating layer and good qualities, and a manufacturing method thereof.

Technical solution

In order to achieve the object, the present invention provides an electrode, comprising a current collector; an electrode active material layer formed on at least one surface of the current collector and comprising a mixture of electrode active material particles and a first binder polymer; and a porous coating layer formed on the surface of the electrode active material layer, comprising a mixture of inorganic particles and a second binder polymer and having a thickness deviation defined by the following Formula (1):

$$(T_{max}-T_{min})/T_{avg} \leq 0.35 \qquad (1)$$

wherein $T_{max}$ is a maximum thickness of the porous coating layer formed on the surface of the electrode active material layer, $T_{min}$ is a minimum thickness of the porous coating layer and $T_{avg}$ is an average thickness of the porous coating layer, the thicknesses of the coating layers being observed by an electron microscope.

There is no particular limit to the current collector, so long as it has suitable conductivity without causing adverse chemical changes in terms of producing battery. Examples of the current collector include stainless steel, aluminium, nickel, titanium, sintered carbon, copper; stainless steel surface-treated with carbon, nickel, titanium or silver; an aluminum-cadmium alloy; a non-conductive polymer surface-treated with a conductive material; or a conductive polymer, etc, but is not limited thereto.

The electrode active material particles used in the present invention may be cathode active material particles or anode active material particles depending on the type of electrode. Examples of the cathode active material particles include $LiCoO_2$, $LiNiO_2$, $LiMn_2O_4$, $LiCoPO_4$, $LiFePO_4$, $LiNiMnCoO_2$, $LiNi_{1-x-y-z}Co_xM1_yM2_zO_2$ (wherein M1 and M2 are each independently any one selected from the group consisting of Al, Ni, Co, Fe, Mn, V, Cr, Ti, W, Ta, Mg and Mo, and x, y and z are each independently atomic fractions of oxide-forming elements, where $0 \leq x < 0.5$, $0 \leq y < 0.5$, $0 \leq z < 0.5$, $x+y+z<1$), etc. but are not particularly limited thereto. Examples of the anode active material particles include natural graphite, artificial graphite, carbonaceous materials, LTO, silicone (Si), tin (Sn), etc., but are not particularly limited thereto.

The inorganic particles used in the present invention may be inorganic particles having a dielectric constant of 5 or higher, inorganic particles having the ability to transport lithium ions, etc.

The binder polymer used in the present invention may be polyvinylidene fluoride-co-hexafluoropropylene, polyvinylidene fluoride-co-trichloroethylene, polymethyl methacrylate, polybutyl acrylate, polyacrylonitrile, polyvinylpyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxymethyl cellulose, etc, but is not limited thereto.

Further, the present invention provides a method for manufacturing the above-mentioned electrode, comprising:

(S1) coating at least one surface of a current collector with an active material particles-slurry containing electrode active material particles dispersed therein and a first binder polymer dissolved in a first solvent;

(S2) coating the layer of the active material particles-slurry with an inorganic particles-slurry containing inorganic particles dispersed therein and a second binder polymer dissolved in a second solvent; and (S3) simultaneously drying the first solvent and the second solvent so that the second solvent can be dried first to form a porous coating layer and then the first solvent can be dried to form an electrode active material layer thereby preventing the second binder polymer from being penetrated into the electrode active material layer.

The solvent may be acetone, tetrahydrofuran, methylene chloride, chloroform, dimethylformamide, N-methyl-2-pyrrolidone (NMP), cyclohexane, or water, but is not particularly limited thereto.

Advantageous Effects

The electrode having a porous coating layer according to the present invention can be manufactured by drying a electrode active material layer and the porous coating layer simultaneously, thereby preventing a binder polymer of the porous coating layer from penetrating into the electrode active material layer, and having good quality. In addition, the porous coating layer can be uniformly formed to contribute to the safety of the electrode.

DESCRIPTION OF DRAWINGS

The accompanying drawings illustrate preferred embodiments of the present invention and, together with the foregoing disclosure, serve to provide further understanding of the technical spirit of the present invention. However, the present invention is not to be construed as being limited to the drawings.

<Explanation of Reference Numerals>

| | |
|---|---|
| 100: Electrode | 110: Current collector |
| 120: Electrode active material layer | 130: Porous coating layer |
| 200: Multi slot die | 210: Current collector |
| 220: Active material particles-slurry | 221: First slot |
| 230: Inorganic material slurry | 221: Second slot |
| 290: Guide roller | |

BEST MODE

Hereinafter, the present invention will be described in detail. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

Figure 1:
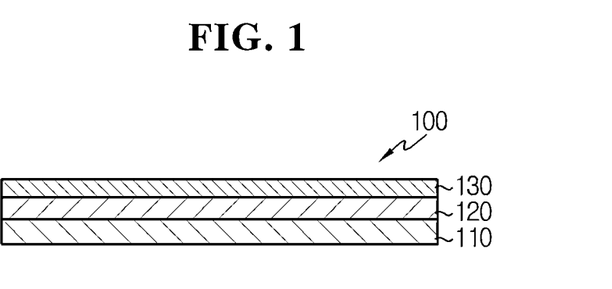
FIG. 1 shows the cross-section of an electrode according to a preferred embodiment of the present invention.

FIG. 1 shows the cross-section of an electrode according to a preferred embodiment proposed herein. However, the embodiments proposed herein are just a preferable example for the purpose of illustrations only, not intended to limit the scope of the disclosure, so it should be understood that other equivalents and modifications could be made thereto without departing from the spirit and scope of the disclosure.

The electrode 100 of the present invention comprises a current collector 110; an electrode active material layer 120 formed on at least one surface of the current collector and comprising a mixture of electrode active material particles and a first binder polymer; and a porous coating layer 130 formed on the surface of the electrode active material layer, comprising a mixture of inorganic particles and a second binder polymer and having a thickness deviation defined by the following Formula (1):

$$(T_{max} - T_{min})/T_{avg} \leq 0.35 \tag{1}$$

wherein $T_{max}$ is a maximum thickness of the porous coating layer formed on the surface of the electrode active material layer, $T_{min}$ is a minimum thickness of the porous coating layer and $T_{avg}$ is an average thickness of the porous coating layer, the thicknesses of the coating layers being observed by an electron microscope.

There is no particular limit to the current collector, so long as it has suitable conductivity without causing adverse chemical changes in terms of producing battery. Examples of the current collector include stainless steel, aluminum, nickel, titans sintered carbon, copper; stainless steel surface-treated with carbon, nickel, titanium or silver; an aluminum-cadmium alloy; a non-conductive polymer surface-treated with a conductive material; or a conductive polymer, etc, but is not limited thereto.

In the electrode, the electrode active material layer comprises a mixture of electrode active material particles and a binder polymer, in which the electrode active material particles have a diameter of about 10 μm. Such an electrode active material layer may have a rough surface due to the exposure of the electrode active material particles. On such rough surface, if a slurry comprising a mixture of inorganic particles and a binder polymer is coated to form a porous coating layer, the porous coating layer becomes uneven after drying, and thus it may causes safety problems when used in batteries. In order to solve the safety problems, the thickness of the porous coating layer should be increased, but if the thickness increases over a certain level, the resistance may also increase. In addition, during forming the porous coating layer by applying the slurry comprising a mixture of the inorganic particles and the binder polymer on the electrode active material layer, the inorganic particles and the binder polymer may penetrate into the electrode active material layer to block the pores present in the electrode active material layer and increase the resistance, which may deteriorate the quality of the electrode.

Meanwhile, the electrode 100 according to the present invention may be manufactured by applying a slurry containing a mixture of electrode active material particles and a first binder polymer for forming an electrode active material layer 120 on a surface of a current collector 110; applying a slurry containing a mixture of inorganic particles and a second binder polymer for forming a porous coating layer 130; and simultaneously drying the slurries. During the drying step, the porous coating layer 130 first forms to prevent the inorganic particles and the second binder polymer from being penetrated into the electrode active material layer 120 and make porous coating layer 130 be uniform.

The porous coating layer (130) formed thus has a thickness deviation defined by the following Formula (1):

$$(T_{max}-T_{min})/T_{avg} \leq 0.35 \qquad (1)$$

wherein $T_{max}$ is a maximum thickness of the porous coating layer formed on the surface of the electrode active material layer, $T_{min}$ is a minimum thickness of the porous coating layer and $T_{avg}$ is an average thickness of the porous coating layer.

The thicknesses deviation may be measured by observing the cross-section of the electrode with an electron microscope, and when such thickness deviation calculated from the measured thicknesses satisfies the range defined in Formula (1), the porous coating layer as a separating layer is considered to have a constant thickness, from which the safety of a battery can be ensured, and the coating layer surface can have a constant sheet resistance. Since the porous coating layer 130 of the present invention satisfies the desired thickness deviation and thus has a favorable sheet resistance, it is not necessary to make the porous coating layer 130 thicker excessively for the safety of a secondary battery. This contributes to a decrease in the resistance of the electrode.

The electrode active material layer 120 of the present invention has a packing density ranging from 3.0 to 3.9 g/cm$^3$, preferably from 3.2 to 3.7 g/cm$^3$ when the electrode is a cathode, and a packing density ranging from 1.3 to 1.8 g/cm$^3$, preferably from 1.4 to 1.7 g/cm$^3$ when the electrode is a anode.

When the packing density is less than the range, a contact between an active material and a conductive material is not enough, and it is difficult for a current to flow a current collector. When it is higher than the range, the pores within the active material layer are not enough, and it is difficult to deliver an electrolyte solution.

Meanwhile, if the electrode is manufactured by first applying a solvent on a surface of an electron active material layer in order to avoid a penetration of a binder polymer, a packing density of the electrode active material layer is decreased by the applied solvent, which causes the decline in the quality of the electrode. In addition, during secondly applying inorganic particles, if the size of the inorganic particles applied is smaller than the surface roughness of the electrode, the inorganic particles penetrate into the pores between the electrode active material particles to reduce the pores for delivering an electrolyte into the electrode active material layer, thereby the performance of batteries is degraded.

The electrode active material particles used in the present invention may be cathode active material particles or anode active material particles depending on the type of electrode. Examples of the cathode active material particles include $LiCoO_2$, $LiNiO_2$, $LiMn_2O_4$, $LiCoPO_4$, $LiFePO_4$, $LiNiMnCoO_2$, $LiNi_{1-x-y-z}Co_xM1_yM2_zO_2$ (wherein M1 and M2 are each independently any one selected from the group consisting of Al, Ni, Co, Fe, Mn, V, Cr, Ti, W, Ta, Mg and Mo, and x, y and z are each independently atomic fractions of oxide-forming elements, where $0 \leq x < 0.5$, $0 \leq y < 0.5$, $0 \leq z < 0.5$, $x+y+z<1$), and a mixture thereof, but are not particularly limited thereto. Examples of the anode active material particles include natural graphite, artificial graphite, carbonaceous materials, LTO, silicone (Si), tin (Sn), and a mixture thereof, but are not particularly limited thereto.

The inorganic particles used in the present invention may be inorganic particles having a dielectric constant of 5 or higher, inorganic particles having the ability to transport lithium ions, a mixture thereof, etc.

Examples of the inorganic particles having a dielectric constant of 5 or higher include $BaTiO_3$, $Pb(Zr_x, Ti_{1-x})O_3$ (PZT, $0<x<1$), $Pb_{1-x}La_xZr_{1-y}Ti_yO_3$ (PLZT, $o \leq x \leq 1$, $0<y<1$), $(1-x)Pb(Mg_{1/3}Nb_{2/3})O_{3-x}PbTiO_3$ (PMN—PT, $0<x<1$), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC, $TiO_2$, and a mixture thereof, but are not particularly limited thereto.

Examples of the inorganic particles having the ability to transport lithium ions include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ type glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$ type glass ($Li_xSi_yS_z$, $0<x<3$, $0<y<2$, $0<z<4$), $P_2S_5$ type glass ($Li_xP_yS_z$, $0<x<3$, $0<y<3$, $0<z<7$), and a mixture thereof, but are not particularly limited thereto.

The first binder polymer and the second binder polymer are the same or not, and may be polyvinylidene fluoride-co-hexafluoropropylene, polyvinylidene fluoride-co-trichloroethylene, polymethyl methacrylate, polybutyl acrylate, polyacrylonitrile, polyvinylpyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, and carboxymethyl cellulose, and a mixture thereof, but are not particularly limited thereto.

In another aspect of the invention, the electrode of the present invention can be manufactured by forming a porous coating layer on an electrode active material layer. The specific process thereof will be described below.

First, at least one surface of a current collector is coated with a active material particles-slurry containing electrode active material particles dispersed therein and a first binder polymer dissolved in a first solvent (Step S1).

The electrode active material particles may be cathode active material particles or anode active material particles depending on the type of electrode, and the examples thereof are listed above.

The first binder polymer has preferably a glass transition temperature ($T_g$) of −200 to 200° C. so as to improve the mechanical properties such as flexibility and elasticity of the coating layer finally formed.

Also, the first binder polymer is not necessarily required to have ionic conductivity, however, a polymer having ionic conductivity may be used to improve the performances of electrochemical devices. Accordingly, the first binder polymer used in the present invention preferably includes one having a high dielectric constant. The specific examples of the first binder polymer are listed above.

Non-limiting examples of the first solvent include acetone, tetrahydrofuran, methylene chloride, chloroform, dimethylformamide, N-methyl-2-pyrrolidone (NMP), cyclohexane, water, and a mixture thereof. It is preferable to use a easy-to-dry solvent.

The active material particles-slurry containing the electrode active material particles dispersed therein and the first binder polymer dissolved in the first solvent can be prepared by dissolving the first binder polymer in the first solvent, followed by adding and dispersing the active material particles. The active material particles may be pulverized in an optimum size before adding. However it is preferred that the active material particles are added to the first binder polymer-containing solution, followed by pulverizing and dispersing the active material particles by way of ball milling. In addition, the active material particles-slurry may include a conductive material to improve the ion conductivity thereof.

After then, the layer formed by the coating of the active material particles-slurry is coated with an inorganic particles-slurry containing inorganic particles dispersed therein and a second binder polymer dissolved in a second solvent (Step S2).

The inorganic particles are not particularly limited if they are electrochemically stable. That is, the inorganic particles which may be used in the present invention are not particularly limited unless an oxidation-reduction reaction occurs in an operating voltage range (for example, 0 to 5 V based on Li/Li$^+$) of an applied electrochemical device. Particularly, inorganic particles having a high dielectric constant may be used to increase a dissociation rate of an electrolyte salt, e.g., a lithium salt, in a liquid electrolyte, thereby improving an ionic conductivity of the electrolyte. Specific examples of the inorganic particles are listed above.

The inorganic particles are not particularly limited to their size, but preferably have an average diameter of 0.001 to 10 µm for the formation of a coating layer having a uniform thickness and a proper porosity. When the average diameter of the inorganic particles is less than 0.001 µm, the dispersion of the particles may deteriorate. When the average diameter of the inorganic particles is higher than 10 µm, the thickness of the coating layer formed may increase.

The second binder polymer has preferably a glass transition temperature ($T_g$) of −200 to 200° C. so as to improve the mechanical properties such as flexibility and elasticity of the coating layer finally formed.

Also, the second binder polymer is not necessarily required to have ionic conductivity, however, a polymer having ionic conductivity may be used to improve the performances of electrochemical devices. Accordingly, the second binder polymer used in the present invention preferably includes one having a high dielectric constant. Actually, the dissociation rate of a salt in an electrolyte solution depends on a dielectric constant of the electrolyte solution. Therefore, as the dielectric constant of the second binder polymer is higher, the dissociation rate of a salt in an electrolyte solution increases. In this regard, the second binder polymer may have a dielectric constant of 1.0 to 100 (measuring frequency=1 kHz), preferably 10 or higher.

In addition, the second binder polymer may be gelatinized when impregnated with a liquid electrolyte solution to exhibit a high electrolyte solution imprenation ratio(degree of swelling). It is preferred that the binder polymer has a solubility parameter of 15 to 45 MPa$^{1/2}$, more preferably 15 to 25 MPa$^{1/2}$, most preferably 30 to 45 MPa$^{1/2}$. Accordingly, a hydrophilic polymer having many polar groups is favorably used as compared to a hydrophobic polymer such as polyolefine. When the solubility parameter of the polymer is less than 15 MPa$^{1/2}$ or higher than 45 MPa$^{1/2}$, the polymer is difficult to be impregnated with a conventional liquid electrolyte solution for a battery. Specific examples of the second binder polymer are listed above.

The inorganic particles and the second binder polymer are preferably used in a weight ratio of 50:50 to 99:1, more preferably 70:30 to 95:5. When the weight ratio of the inorganic particles and the binder polymer is less than 50:50, the amount of the polymer increases to reduce the pore size and porosity of the coating layer formed. When the amount of the inorganic particles is higher than 99 parts by weight, the amount of the second bind polymer decreases to lower the anti-peeling property of the coating layer formed.

It is preferred that the solvent of the second binder polymer (i.e. the second solvent) has a solubility parameter similar to that of the second binder polymer to be used and a low boiling point, so as to achieve uniform mixture and easy removal of the solvent afterward. Non-limiting examples of the solvent which may be used in the present invention include acetone, tetrahydrofuran, methylene chloride, chloroform, dimethylformamide, N-methyl-2-pyrrolidone (NMP), cyclohexane, water and a mixture thereof.

The slurry containing the inorganic particles dispersed therein and the second binder polymer dissolved in the second solvent may be prepared by dissolving the second binder polymer in the second solvent, followed by adding and dispersing the inorganic particles. The inorganic particles may be pulverized in an optimum size before adding. However it is preferred that the inorganic particles are added to the second binder polymer-containing solution, followed by pulverizing and dispersing the inorganic particles by way of ball milling.

The coating step of the active material particles-slurry (S1) and the coating step of the inorganic particles-slurry (S2) may be performed continuously or non-continuously by various ways, such as slot die coating, slide coating, curtain coating, etc. Especially, in terms of productivity, the coating step of the active material particles-slurry (S1) and the coating step of the inorganic particles-slurry (S2) are preferably performed continuously or simultaneously, as shown in FIG. 2.

Figure 2:
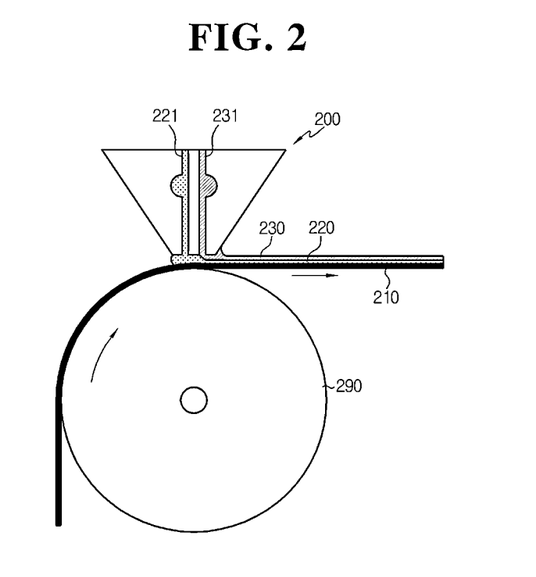
FIG. 2 is a diagram showing schematically a method of manufacturing an electrode in accordance with a preferred embodiment of the present invention.

Referring to FIG. 2, a multiple slot die 200 having two slots 221, 231 is used in order to perform the coating step of the active material particles-slurry (S1) and the coating step of the inorganic particles-slurry (S2). The active material particles-slurry 220 containing the active material particles dispersed therein and the first binder polymer dissolved in the first solvent is supplied through the first slot 221. In addition, the inorganic particles slurry 230 is supplied through the second slot 231. When the current collector 210 is provided to the rotating guide roller 290, the active material particles-slurry 220 is coated on the current collector 210 and subsequently, the inorganic particles slurry 230 is coated on the layer of the active material particles slurry 220.

Finally, the first solvent and the second solvent are simultaneously treated for dry so that the second solvent can be first dried to form the porous coating layer and then the first solvent can be dried to form the electrode active material layer, thereby preventing the second binder polymer from being penetrated into the electrode active material layer (Step S3).

In regard with (S3), the first solvent in the active material particles-slurry and the second solvent in the inorganic particles-slurry should be simultaneously treated to dry for the following reasons.

When the product from (S2) is passed through a dryer, etc., the second solvent in the inorganic particles-slurry coated on the outer of the product is first dried and then the first solvent is dried. That is, when the second solvent in the inorganic particles slurry is dried, the inorganic particles are connected and firmed by the second binder polymer so as to form the pores due to the space (interstitial volume) between the inorganic particles, thereby first forming the porous coating layer on the outer. Then, similarly to the porous coating layer, the first solvent in the active material particles-slurry is dried so that the active material particles can be connected and firmed by the first binder polymer to form pores, thereby forming the electrode active material layer.

Unlike the present invention, if the coating layer of the active material particles-slurry containing the first binder dissolved in the first solvent is first dried to form the electrode active material layer and then the inorganic particles slurry is applied thereon, the second binder polymer and the inorganic particles may be penetrated into the pores within the electrode active material layer to reduce the porosity and increase the resistance, thereby causing the decline in the electron quality. Furthermore, as the electrode active material particles have a diameter of about 10 µm and is exposed in on the surface of the electrode active material layer, the surface of the electrode active material layer becomes rough. Meanwhile, the inorganic particles have a dimeter of tens of nm, so if a slurry of the inorganic particles is applied on the surface of the electrode active material layer to form a porous coating layer, the porous coating layer may be unevenly formed after drying, which causes the safety problems of batteries. In addition, the porous coating layer may be uneven due to holes and blisters which are produced on the surface of the porous coating layer during the penetration of the inorganic particles-slurry into the pores of the electrode active material layer. In this regard, in order to form a uniform porous coating layer, there has been a try of first applying a solvent on the surface of the electrode active material layer before the inorganic particles-slurry is applied. However, in this case, the uniformity of the porous coating layer may be improved, but another problem such as the decrease of the packing density due to the solvent absorption of the electrode active material layer occurs.

Furthermore, the present invention provides an electrochemical device including a cathode, an anode and an electrolyte solution, wherein the cathode and the anode have a porous coating layer consisting of inorganic particles and a second binder polymer on the surface thereof, the porous coating layer being capable of replacing a separator. The electrochemical device may be any device in which electrochemical reactions may occur, and specific examples of the electrochemical devices include all types of primary batteries, secondary batteries, fuel cells, solar cells or capacitors.

The electrochemical device may be manufactured using the electrode prepared above. For examples, it may be manufactured by assembling the electrode prepared above in which a coating layer is formed, by way of winding or stacking, and introducing an electrolyte solution therein, without using a conventional polyolefin-based microporous separator. In addition, a separator may be optionally interposed between the cathode and the anode in manufacturing the electrochemical device.

The electrochemical device of the present invention may selectively use an electrolyte solution obtained by dissolving a salt in an organic solvent. The salt has a structure represented by $A^+B^-$ wherein $A^+$ is an alkali metal cation such as $Li^+$, $Na^+$, $K^+$ and a combination thereof and $B^-$ is an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ and a combination thereof. Examples of the organic solvent include propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), γ-butyrolactone and a mixture thereof, but are not limited thereto.

The electrolyte solution may be introduced in any suitable step during the manufacturing of the electrochemical device depending on the manufacturing processes and desired physical properties of a final product. Specifically, the electrolyte may be introduced before assembling a battery or in the final step of the assembling.

Hereinafter, various preferred examples of the present invention will be described in detail for better understanding. However, the examples of the present invention may be modified in various ways, and they should not be interpreted as limiting the scope of the invention. The examples of the present invention are just for better understanding of the invention to persons having ordinary skill in the art.

EXAMPLE

Example 1

Preparation of Electrode by Way of Simultaneously Drying Anode Active

Material Particles-slurry and Inorganic Particles-slurry after their Application A first binder polymer made of Styrene butadiene rubber (SBR) and carboxymethyl cellulose (CMC) mixed in weight ratio of 2:1 was added to water as a first solvent and dissolved, to obtain a binder solution. To the binder solution, graphite as an anode active material particles and Super-P as a conductive material were added to obtain an aqueous anode active material particles-slurry.

Meanwhile, a second binder polymer made of Styrene butadiene rubber (SBR) and carboxymethyl cellulose (CMC) mixed in weight ratio of 2:1 was added to water as a second solvent and dissolved, to obtain an aqueous solution. Into the aqueous solution, inorganic particles made of alumina ($Al_2O_3$) and barium titanate ($BaTiO_3$) mixed in weight ratio of 9:1 were dispersed to obtain an inorganic particles slurry.

Figure 3:
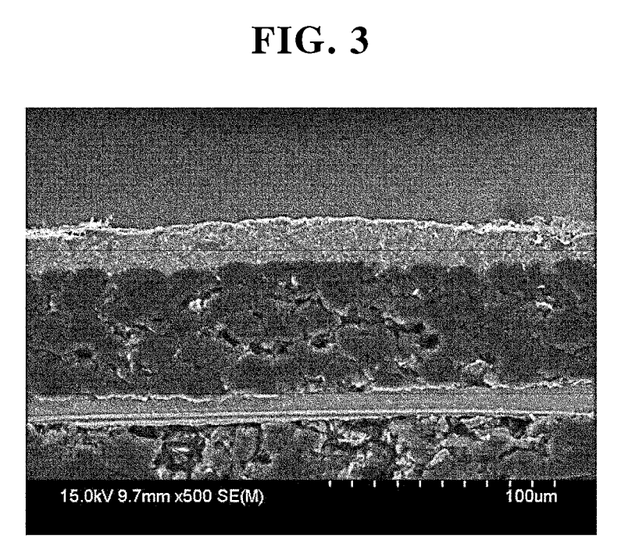
FIG. 3 is an SEM photograph of the cross section of the electrode manufactured in Example 1.

The anode active material particles-slurry as a lower layer and the inorganic particles slurry as a top layer are coated on a current collector made of copper as a substrate by using a multi-layers slot die coater, to form double coating layers simultaneously. The double coating layers were simultaneously treated to dry, so as to first dry the outer (i.e. the top of the inorganic particles slurry layer) and then pressed by a roll press. The cross-section of the sample obtained in the above was observed with SEM. It was confirmed that the anode active material layer and the porous coating layer were formed apart from each other, as shown in FIG. 3.

Comparative Example 1

Figure 4:
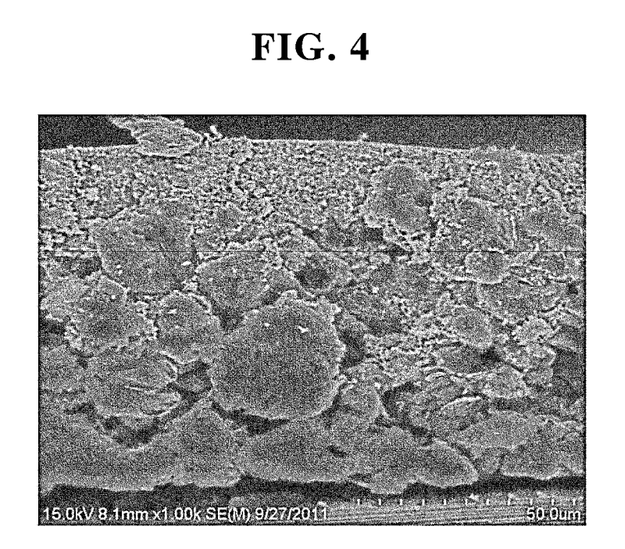
FIG. 4 is an SEM photograph of the cross section of the electrode manufactured in Comparative Example 2.

Preparation of Electrode by Way of First Forming Electrode Active Material Layer, Followed by Applying and Drying Inorganic Particles-slurry The anode active material particles-slurry and the inorganic particles-slurry were prepared as in Example 1. The anode active material particles-slurry was first coated on a current collector made of a copper as a substrate to form the electrode active material layer. Sequentially, the pores present in the anode active material layer were filled with ethanol as a solvent, and then the electrode active material layer was secondly coated with the inorganic particles slurry, before drying. After simultaneously drying, pressing by a roll press was carried out. The cross-section of the sample obtained in the above was observed with SEM. It was confirmed that the inorganic particles were penetrated into the space between the anode active materials particles, as shown in FIG. 4.

Experimental Example 1

Measurement of Thickness Deviation of Porous Coating Layer

The thicknesses of the porous coating layers were numerically expressed by an image analysis using SEM images (FIG. 3 and FIG. 4) from the cross-sections of the electrodes prepared in Example 1 and Comparative Example 1. The thickness deviations were calculated by Formula 1. The results thereof are shown in Table 1.

TABLE 1

|  | Example 1 | Comparative Example 1 |
| --- | --- | --- |
| $T_{Max}$ | 20.52 | 19.38 |
| $T_{Min}$ | 16.05 | 5.01 |
| $T_{avg}$ | 17.35 | 14.69 |
| Thickness deviation from Formula 1 | 0.26 | 0.98 |

Experimental Example 2

Measurement of Packing Density

In the electrode of Example 1, packing densities were measured using the electrode weight and thickness of the samples in which some samples were obtained by applying the anode active material particles-slurry as a lower layer on the substrate (single layer coating sample) and then the other samples were obtained by further applying the inorganic particles slurry as a top layer on the anode active material layer (multi layers coating sample).

In the electrode of Comparative Example 1, packing densities were measured using the electrode weight and thickness from the electrodes obtained after the first coating (single layer coating sample) and the electrodes obtained after the second coating (multi layers coating sample).

Table 2 shows the densities of the single layer coating samples and the multi layers coating samples of electrodes obtained in Example 1 and Comparative Example 1.

TABLE 2

|  | Example 1 | Comparative Example 1 |
| --- | --- | --- |
| Single layer coating sample | 1.52 g/cm³ | 1.53 g/cm3 |
| Multi layer coating sample | 1.50 g/cm³ | 1.34 g/cm³ |

As can be seen in Table 2, when the electrode active material layer and the porous coating layer are formed simultaneously as in Example 1, the packing densities were not affected, whereas when a solvent was first applied on the pre-formed electrode active material layer, followed by forming the porous coating layer as in Comparative Example 1, a packing density decrease was confirmed.

What is claimed is:

1. An electrode comprising
a current collector;
an electrode active material layer formed on at least one surface of the current collector and comprising a mixture of electrode active material particles and a first binder polymer; and
a porous coating layer formed on the surface of the electrode active material layer, comprising a mixture of inorganic particles and a second binder polymer and having a thickness deviation defined by the following Formula (1):

$$(T_{max} - T_{min})/T_{avg} \leq 0.35 \qquad (1)$$

wherein $T_{max}$ is a maximum thickness of the porous coating layer formed on the surface of the electrode active material layer, $T_{min}$ is a minimum thickness of the porous coating layer and $T_{avg}$ is an average thickness of the porous coating layer, the thicknesses of the coating layers being observed by an electron microscope.

2. The electrode according to claim 1, wherein the electrode active material layer has a density ranging from 3.0 to 3.9 g/cm³ when the electrode is a cathode and a density ranging from 1.3 to 1.8 g/cm³ when the electrode is an anode.

3. The electrode according to claim 1, wherein the current collector is stainless steel, aluminum, nickel, titanium, sintered carbon, copper; stainless steel surface-treated with carbon, nickel, titanium or silver; an aluminum-cadmium alloy; a non-conductive polymer surface-treated with a conductive material; or a conductive polymer.

4. The electrode according to claim 1, wherein the electrode active material particles are cathode active material particles of any one selected from the group consisting of $LiCoO_2$, $LiNiO_2$, $LiMn_2O_4$, $LiCoPO_4$, $LiFePO_4$, $LiNiMnCoO_2$ and $LiNi_{1-x-y-z}Co_xM1_yM2_zO_2$ (wherein, M1 and M2 are each independently any one selected from the group consisting of Al, Ni, Co, Fe, Mn, V, Cr, Ti, W, Ta, Mg and Mo, and x, y and z are each independently atomic fractions of oxide-forming elements, where $0 \leq x<0.5$, $0 \leq y<0.5$, $0 \leq z<0.5$, and $x+y+z<1$) and a mixture thereof.

5. The electrode according to claim 1, wherein the electrode active material particles are anode active material particles of any one selected from the group consisting of natural graphite, artificial graphite, carbonaceous materials, LTO, silicone (Si) and tin (Sn) and a mixture thereof.

6. The electrode according to claim 1, wherein the inorganic particles further comprise inorganic particles selected from the group consisting of inorganic particles having a dielectric constant of 5 or higher, inorganic particles having the ability to transport lithium ions and a mixture thereof.

7. The electrode according to claim 6, wherein the inorganic particles having a dielectric constant of 5 or higher are inorganic particles of any one selected from the group consisting of $BaTiO_3$, $Pb(Zr_x, Ti_{1-x})O_3$ (PZT, $0<x<1$), $Pb_{1-x}La_xZr_{1-y}Ti_yO_3$ (PLZT, $0<x<1$, $0<y<1$), $(1-x)Pb(Mg_{1/3}Nb_{2/3})O_3-xPbTiO_3$ (PMN—PT, $0<x<1$), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC, $TiO_2$ and a mixture thereof.

8. The electrode according to claim 6, wherein the inorganic particles having the ability to transport lithium ions are inorganic particles of any one selected from the group consisting of lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ type glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, 0<x<4, 0<y<2), $SiS_2$ type glass ($Li_xSi_yS_z$, 0<x<3, 0<y<2, 0<z<4), $P_2S_5$ type glass ($Li_xP_yS_z$, 0<x<3, 0<y<3, 0<z<7), and a mixture thereof.

9. The electrode according to claim 1, wherein the first binder polymer and the second binder polymer are each independently selected from the group consisting of polyvinylidene fluoride-co-hexafluoropropylene, polyvinylidene fluoride-co-trichloroethylene, polymethyl methacrylate, polybutyl acrylate, polyacrylonitrile, polyvinylpyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxymethyl cellulose and a mixture thereof.

10. A method for manufacturing the electrode according to claim 1, comprising:
 (S1) coating at least one surface of a current collector with an active material particles-slurry containing electrode active material particles dispersed therein and a first binder polymer dissolved in a first solvent;
 (S2) coating the layer of the active material particles-slurry with an inorganic particles-slurry containing inorganic particles dispersed therein and a second binder polymer dissolved in a second solvent; and
 (S3) simultaneously drying the first solvent and the second solvent so that the second solvent can be first dried to form a porous coating layer and then the first solvent can be dried to form an electrode active material layer thereby preventing the second binder polymer from being penetrated into the electrode active material layer.

11. The method according to claim 10, wherein the first solvent and the second solvent are each independently selected from the group consisting of acetone, tetrahydrofuran, methylene chloride, chloroform, dimethylformamide, N-methyl-2-pyrrolidone (NMP), cyclohexane, water, and a mixture thereof.

12. The method according to claim 10, wherein the current collector is stainless steel, aluminum, nickel, titanium, sintered carbon, copper; stainless steel surface-treated with carbon, nickel, titanium or silver; an aluminum-cadmium alloy; a non-conductive polymer surface-treated with a conductive material; or a conductive polymer.

13. The method according to claim 10, wherein the electrode active material particles are cathode active material particles of any one selected from the group consisting of $LiCoO_2$, $LiNiO_2$, $LiMn_2O_4$, $LiCoPO_4$, $LiFePO_4$, $LiNiMnCoO_2$, $LiNi_{1-x-y-z}Co_xM1_yM2_zO_2$ (wherein, M1 and M2 are each independently any one selected from the group consisting of Al, Ni, Co, Fe, Mn, V, Cr, Ti, W, Ta, Mg and Mo, and x, y and z are each independently atomic fractions of oxide-forming elements, where 0≤x<0.5, 0≤y<0.5, 0≤z<0.5, and x+y+z<1) and a mixture thereof.

14. The method according to claim 10, wherein the electrode active material particles are anode active material particles of any one selected from the group consisting of natural graphite, artificial graphite, carbonaceous materials, LTO, silicone (Si) and tin (Sn) and a mixture thereof.

15. The method according to claim 10, wherein the inorganic particles further comprise inorganic particles selected from the group consisting of inorganic particles having a dielectric constant of 5 or higher, inorganic particles having the ability to transport lithium ions, and a mixture thereof.

16. The method according to claim 15, wherein the inorganic particles having a dielectric constant of 5 or higher are inorganic particles of any one selected from the group consisting of $BaTiO_3$, $Pb(Zr_x, Ti_{1-x})O_3$ (PZT, 0<x<1), $Pb_{1-x}La_xZr_{1-y}Ti_yO_3$ (PLZT, 0<x<1, 0<y<1), $(1-x)Pb(Mg_{1/3}Nb_{2/3})O_3-xPbTiO_3$ (PMN—PT, 0<x<1), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC, and $TiO_2$ and a mixture thereof.

17. The method according to claim 15, wherein the inorganic particles having the ability to transport lithium ions are inorganic particles of any one selected from the group consisting of lithium phosphate ($Li_3PO_4$), lithium titanium phosphate ($Li_xTi_y(PO_4)_3$, 0<x<2, 0<y<3), lithium aluminum titanium phosphate ($Li_xAl_yTi_z(PO_4)_3$, 0<x<2, 0<y<1, 0<z<3), $(LiAlTiP)_xO_y$ type glass (0<x<4, 0<y<13), lithium lanthanum titanate ($Li_xLa_yTiO_3$, 0<x<2, 0<y<3), lithium germanium thiophosphate ($Li_xGe_yP_zS_w$, 0<x<4, 0<y<1, 0<z<1, 0<w<5), lithium nitride ($Li_xN_y$, 0<x<4, 0<y<2), $SiS_2$ type glass ($Li_xSi_yS_z$, 0<x<3, 0<y<2, 0<z<4), $P_2S_5$ type glass ($Li_xP_yS_z$, 0<x<3, 0<y<3, 0<z<7), and a mixture thereof.

18. The method according to claim 10, wherein the first binder polymer and the second binder polymer are each independently selected from the group consisting of polyvinylidene fluoride-co-hexafluoropropylene, polyvinylidene fluoride-co-trichloroethylene, polymethyl methacrylate, polybutyl acrylate, polyacrylonitrile, polyvinylpyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxymethyl cellulose and a mixture thereof.

19. An electrochemical device comprising a cathode, an anode and an electrolyte, wherein the cathode, the anode or both electrodes are the electrode defined in claim 1.

20. The electrochemical device according to claim 19, which is a lithium secondary battery.

* * * * *